United States Patent
Ziraldo

(10) Patent No.: US 10,220,792 B2
(45) Date of Patent: Mar. 5, 2019

(54) ROOF RACK CROSSBAR

(71) Applicant: Honda Motor Co., Ltd., Tokyo (JP)

(72) Inventor: Nicholas P. Ziraldo, Powell, OH (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 177 days.

(21) Appl. No.: 15/245,295

(22) Filed: Aug. 24, 2016

(65) Prior Publication Data

US 2018/0056884 A1 Mar. 1, 2018

(51) Int. Cl.
*B60R 9/052* (2006.01)

(52) U.S. Cl.
CPC .................... *B60R 9/052* (2013.01)

(58) Field of Classification Search
CPC .. B60R 9/00; B60R 9/04; B60R 9/048; B60R 9/05; B60R 9/052; B60R 9/058; B60R 9/08; B60R 9/10; B60R 9/12
USPC ........ 224/309, 316, 319, 321–327, 329–331; D12/412, 414, 406; 280/180.1, 180.5
See application file for complete search history.

(56) References Cited

U.S. PATENT DOCUMENTS

| 4,335,840 | A | | 6/1982 | Williams | |
|---|---|---|---|---|---|
| 4,456,158 | A | * | 6/1984 | Wertz | B60R 9/12 224/316 |
| 5,273,195 | A | | 12/1993 | Cucheran | |
| 5,282,560 | A | | 2/1994 | Ozog | |
| 5,456,199 | A | | 10/1995 | Kemkamp | |
| 5,456,397 | A | * | 10/1995 | Pedrini | B60R 9/12 224/316 |
| 5,573,159 | A | | 11/1996 | Fisch et al. | |
| 5,845,827 | A | | 12/1998 | Reising | |
| 8,240,526 | B2 | | 8/2012 | Kim | |
| 8,517,237 | B1 | * | 8/2013 | Barber | B60R 9/05 224/316 |
| 8,544,707 | B2 | | 10/2013 | Hubbard | |
| 8,826,842 | B2 | | 9/2014 | Hinrichs | |
| 8,925,775 | B2 | | 1/2015 | Sautter et al. | |
| 2004/0118886 | A1 | * | 6/2004 | Mirshafiee | B60R 9/045 224/315 |
| 2004/0206855 | A1 | * | 10/2004 | Caveney | B60R 16/0215 248/68.1 |
| 2006/0043130 | A1 | | 3/2006 | Dabrowski | |
| 2016/0082892 | A1 | * | 3/2016 | Ferman | B60R 9/052 224/322 |

FOREIGN PATENT DOCUMENTS

| CA | 2151681 A1 | * | 12/1996 | ............. B60R 9/045 |
|---|---|---|---|---|
| DE | 3909853 A1 | * | 9/1990 | ............... B60R 9/05 |

OTHER PUBLICATIONS

Yakima Wind Jammer http://www.austinkayak.com/products/178/ Yakima-Wind-Jammer.html?utm_source=google&utm_medium=cpc &utm_campaign=Shopping:%20ACK%20PLA&scid=scplp285174 &sc_intid=178_609_1&gclid=COafoeCX2s4CFcSGaQodzZkGdg, printed Aug. 24, 2016.
Single Black Aero Crossbar for Car Roof Racks http://www.rackwarehouse.com/inno-xb100-39-inch-black-aero-bars.html, printed Aug. 24, 2016.

* cited by examiner

*Primary Examiner* — Scott McNurlen
(74) *Attorney, Agent, or Firm* — Rankin, Hill & Clark LLP

(57) ABSTRACT

A roof rack assembly includes a cross bar and a tail that is securable to the cross bar. Optionally, the tail has a hardness that is less than a hardness of the cross bar. Optionally, an engagement member is secured to one of the cross bar and the tail and is engageable with the other of the cross bar and the tail to secure the tail to the cross bar.

19 Claims, 7 Drawing Sheets

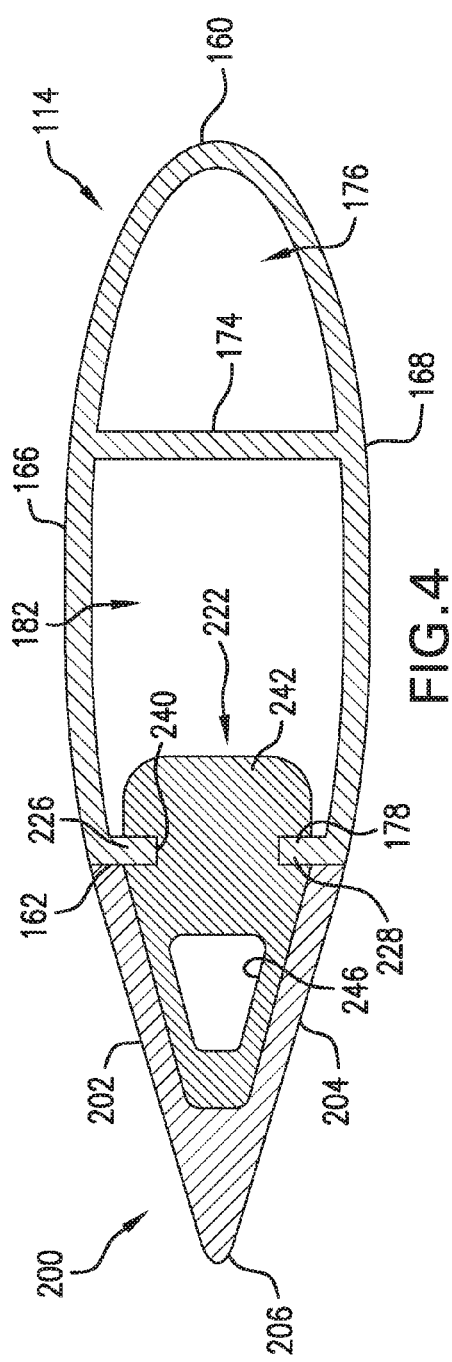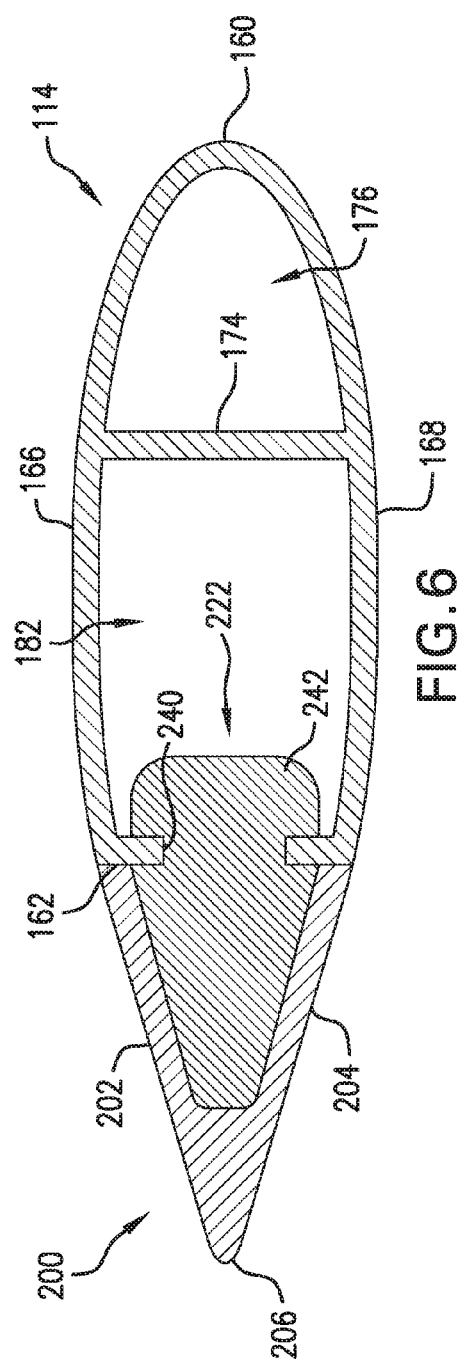

ROOF RACK CROSSBAR

BACKGROUND

Vehicle roof racks typically include rigid structural frames or rails. The frames are generally secured to the vehicle so they do not move or shift. The frames typically include one or more cross bars that extend from one side of the vehicle to the other. The objects to be carried are typically fastened to the cross bars. The cross bars are generally constructed of circular or rectangular tubes. Such tubes are readily available and may be purchased or fabricated fairly inexpensively. In addition, it is fairly easy to fabricate connecting brackets to attach additional support frames to these rectangular or circular cross bars. Although cross bars with circular or rectangular cross-sections have many advantages, they have less than desirable aerodynamic characteristics. When a vehicle with a known roof rack is in motion, high velocity air flows over the cross bars, and the air stream can become turbulent and the flow separates from the surface of a cross bar, increasing drag.

BRIEF DESCRIPTION

According to one aspect, a cross bar assembly comprises a cross bar comprising a hardness, and a tail comprising a hardness that is less than the hardness of the cross bar. The tail is securable to the cross bar.

According to one aspect, a cross bar assembly comprises a cross bar including a leading edge and a trailing edge, an upper side that extends from the leading edge to the trailing edge, and a lower side that extends from the leading edge to the trailing edge. A tail is securable to the cross bar that includes an upper leg that extends from the upper side of the cross bar to a tail trailing edge, and a lower leg that extends from the lower side of the cross bar to the tail trailing edge when the tail is secured to the cross bar. An engagement member is positioned on one of the cross bar and the tail that is engageable with the other of the cross bar and the tail to secure the tail to the cross bar.

According to one aspect, a cross bar assembly comprises a cross bar comprising a hardness, a tail comprising a hardness that is less than the hardness of the cross bar, and an engagement member comprising a hardness that is greater than the hardness of the tail and less than the hardness of the cross bar. The tail is securable to the cross bar, and the engagement member is positioned on one of the cross bar and the tail and is engageable with the other of the cross bar and the tail to secure the tail to the cross bar.

According to one aspect, a cross bar assembly comprises a cross bar including a leading edge, a trailing edge, an upper side that extends from the leading edge to the trailing edge, and a lower side that extends from the leading edge to the trailing edge. The cross bar is at least partially formed of a first material. A separate tail is secured to the trailing edge of the cross bar. The tail includes an upper leg that extends from the upper side of the cross bar to a trailing edge of the tail and a lower leg that extends from the lower side of the cross bar to the tail trailing edge. The tail is at least partially formed of a second material having a hardness less than a hardness of the first material.

According to another aspect, a cross bar assembly comprises a cross bar including a leading edge, a trailing edge, an upper side that extends from the leading edge to the trailing edge, and a lower side that extends from the leading edge to the trailing edge, the cross bar at least partially formed of a first material. A separate tail at least partially formed of a second material having a hardness less than a hardness of the first material is securable to the cross bar and includes an upper leg, a lower leg, and a trailing edge. The upper leg extends from the upper side of the cross bar to the trailing edge of the tail and the lower leg extends from the lower side of the cross bar to the trailing edge of the tail when the tail is secured to the cross bar.

According to another aspect, a cross bar assembly comprises a cross bar including a leading edge and a trailing edge, an upper side that extends from the leading edge to the trailing edge, and a lower side that extends from the leading edge to the trailing edge. A separate tail is secured to the trailing edge of the cross bar. The tail includes an upper leg that extends from the upper side to a tail trailing edge, and a lower leg that extends from the lower side to the tail trailing edge. The trailing edge of the cross bar includes a wall extending between the upper and lower sides, and one of the cross bar and the tail includes an engagement member configured to secure the tail to the wall of the cross bar. The outer surfaces of the respective cross bar upper side and tail upper leg define a continuous upper surface that extends from the cross bar leading edge to the tail trailing edge, and the outer surfaces of the respective cross bar lower side and the tail lower leg define a continuous lower surface that extends from the cross bar leading edge to the tail trailing edge.

According to another aspect, a cross bar assembly comprises a cross bar including a leading edge and a trailing edge, an upper side that extends from the leading edge to the trailing edge, and a lower side that extends from the leading edge to the trailing edge. A separate tail that is securable to the trailing edge of the cross bar includes an upper leg that extends from the upper side to a tail trailing edge, and a lower leg that extends from the lower side to the tail trailing edge when the tail is secured to the cross bar. One of the cross bar and the tail includes an engagement member that is engageable with the other of the cross bar and the tail to secure the tail to the cross bar. The outer surfaces of the respective cross bar upper side and tail upper leg define a continuous upper surface that extends from the cross bar leading edge to the tail trailing edge, and outer surfaces of the respective cross bar lower side and the tail lower leg define a continuous lower surface that extends from the cross bar leading edge to the tail trailing edge when the tail is secured to the cross bar.

According to another aspect, a method of assembling a cross bar assembly comprises providing a cross bar comprised of a first material, the cross bar includes a first end, a second end, a leading edge, a trailing edge, an upper side having an outer surface that extends from the leading edge to the trailing edge, and a lower side having an outer surface that extends from the leading edge to the trailing edge; providing an elongated tail comprised of a second material that is different than the first material, the tail including an upper leg and a lower leg; providing an engagement member on one of the cross bar and the tail; providing a feature for receiving the engagement member on the other of the cross bar and the tail; and positioning the engagement member in the receiving feature to interlock the cross bar and the tail.

Optionally, the second material has a hardness that is less than a hardness of the first material. Optionally, the engagement member is comprised of a third material that a hardness that is greater than the hardness of the second material and is less than the hardness of the first material. Optionally, the engagement member is coextruded with the tail. Optionally, the receiving feature comprises an open-ended channel. Optionally, wherein the step of positioning the engagement member in the receiving feature includes positioning a first end of the tail adjacent the second end of the cross bar to align the engagement member with the receiving feature, and moving the first end of the tail toward the first end of the cross bar to slide the engagement member into the receiving feature to interlock the cross bar and the tail with the first leg positioned adjacent the upper side with an outer surface of the first leg and the outer surface of the upper side forming a continuous upper surface that extends from the cross bar leading edge to a tail trailing edge, and with the second leg positioned adjacent the lower side with an outer surface of the second leg and the outer surface of the lower side forming a continuous lower surface that extends from the cross bar leading edge to the tail trailing edge.

BRIEF DESCRIPTION OF THE DRAWINGS

FIG. 4 is a cross-sectional view of the cross bar of FIG. 2.

FIGS. 6-12 are cross-sectional views of alternative embodiments of a cross bar for the roof rack of FIG. 1.

DETAILED DESCRIPTION

It should, of course, be understood that the description and drawings herein are merely illustrative and that various modifications and changes can be made in the structures disclosed without departing from the present disclosure. In general, the figures of the exemplary roof rack cross bar are not to scale. As used herein, lateral directions are transverse across the vehicle, i.e., left and right directions, and longitudinal directions refer to forward and rearward directions of vehicle travel. It will be appreciated that the various identified components of the exemplary roof rack cross bar disclosed herein are merely terms of art that may vary from one manufacturer to another and should not be deemed to limit the present disclosure.

Figure 1:
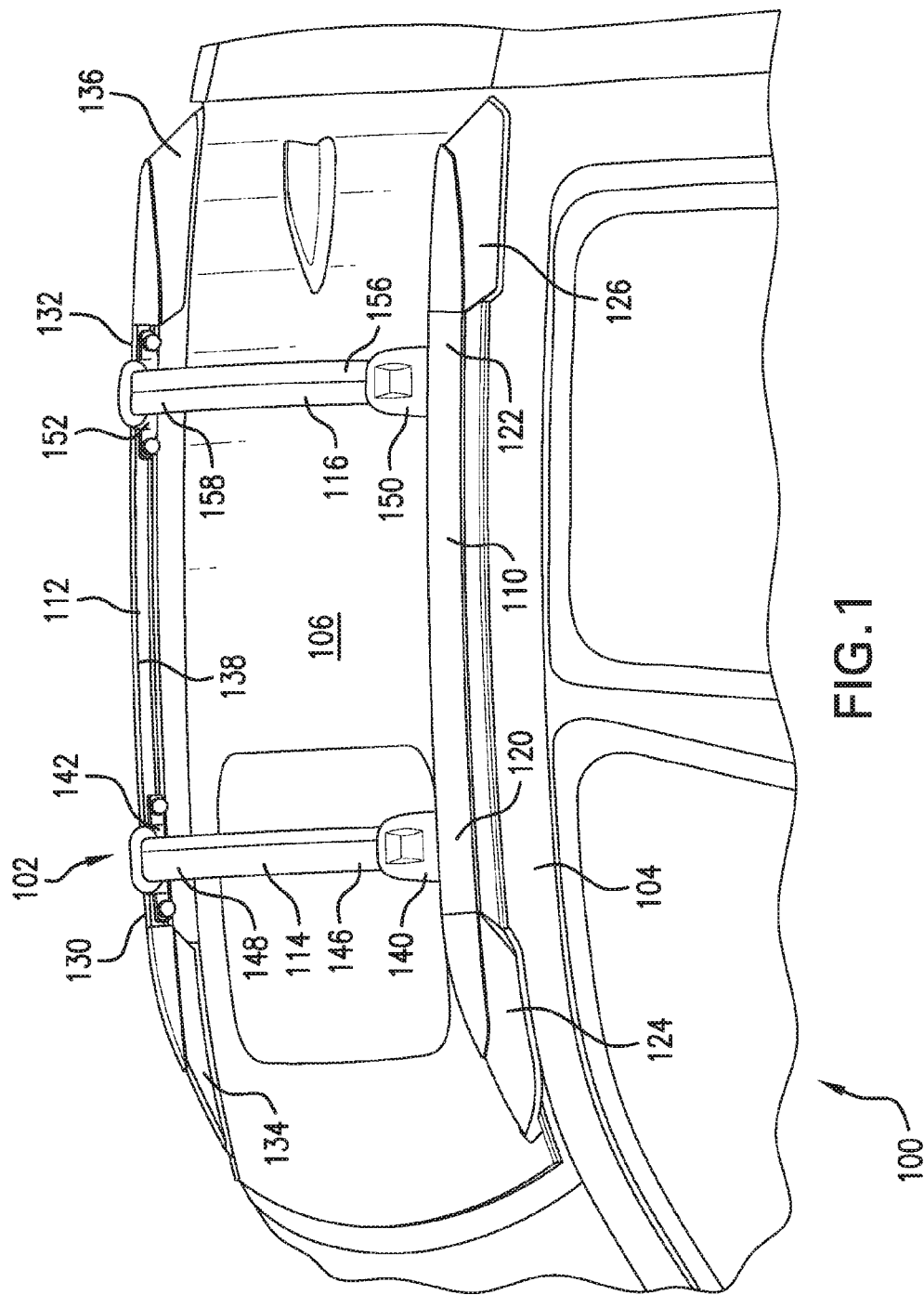
FIG. 1 is a perspective view of a vehicle including a roof rack mounted atop a vehicle roof, the roof rack including a pair of cross bars according to the present disclosure.

Referring now to the drawings, wherein like numerals refer to like parts throughout the several views, FIG. 1 illustrates a vehicle 100 having an exemplary roof rack 102 mounted to a vehicle body 104, particularly a vehicle roof 106. The depicted roof rack 102 includes a first side rail 110 and a second side rail 112, which is spaced laterally apart from the first side rail. Each side rail 110,112 extends longitudinally on the vehicle roof 106. At least one cross bar 114 spans laterally between and is secured to the first and second side rails 110,112, and in the illustrated embodiment, a pair of spaced cross bars 114, 116 are provided on the roof rack 102. Opposite end portions 120, 122 of the first side rail 110 are provided with respective mounts 124, 126. Similarly, opposite end portions 130, 132 of the second side rail 112 are provided with respective mounts 134, 136. Each mount of the roof rack 102 is anchored to the vehicle roof 106 with the aid of traditional fixation means (e.g., fasteners). Each of the first and second side rails 110, 112 can further include elongated guide tracks or channels (only channel 138 of the second rail 112 is visible). The channels receive cross bar connectors 140, 142 secured to respective opposite end portions 146, 148 of the first cross bar 114 and cross bar connectors 150, 152 secure to respective end portions 156, 158 of the second cross bar 116. The connectors can slide within the guide channels thereby allowing selective longitudinal adjustment of the cross bars 114, 116 on the side rails 110, 112.

Figure 2:
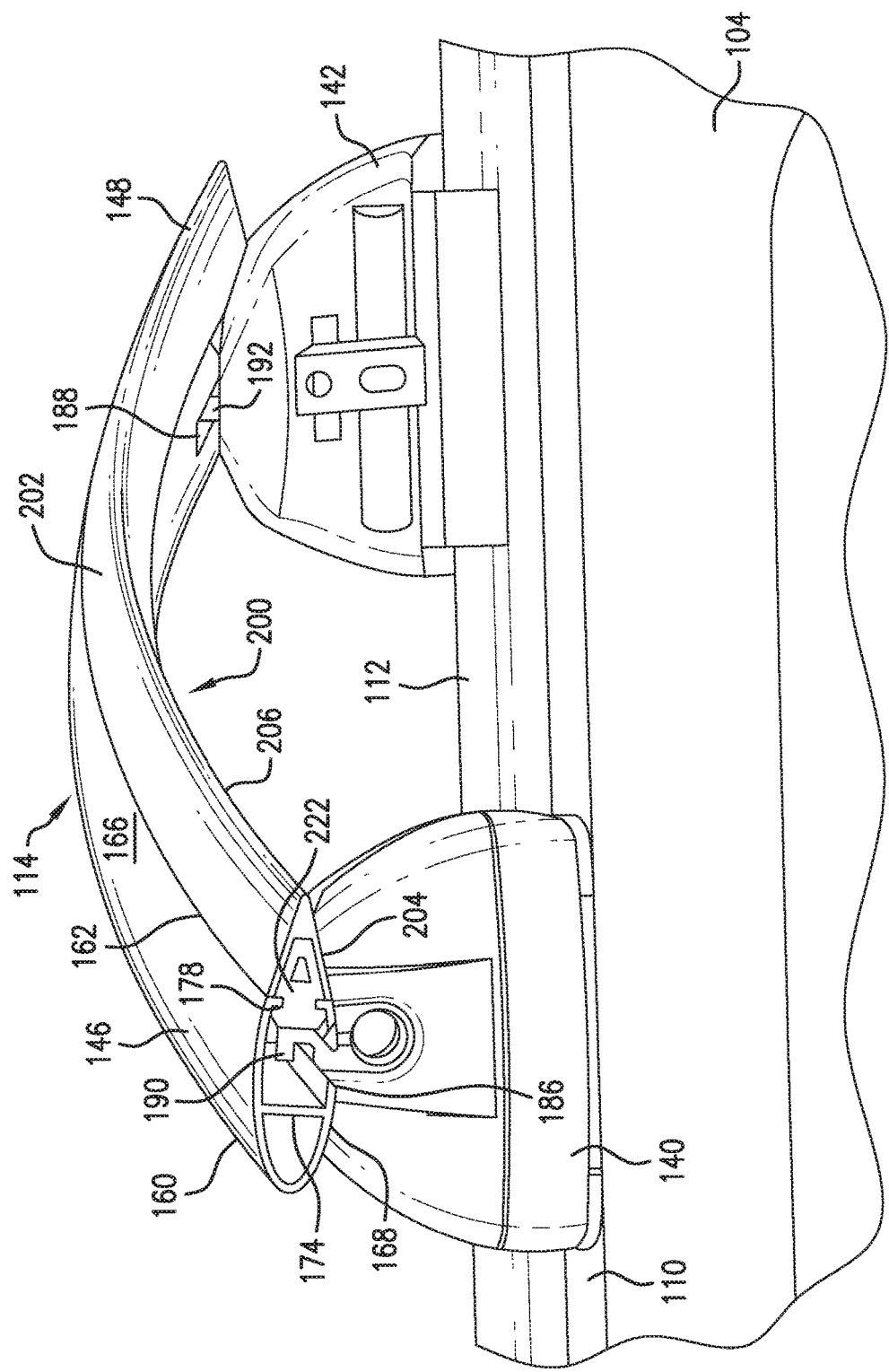
FIG. 2 is a perspective view of one of the cross bars of FIG. 1 with an end cap removed.
Figure 3:
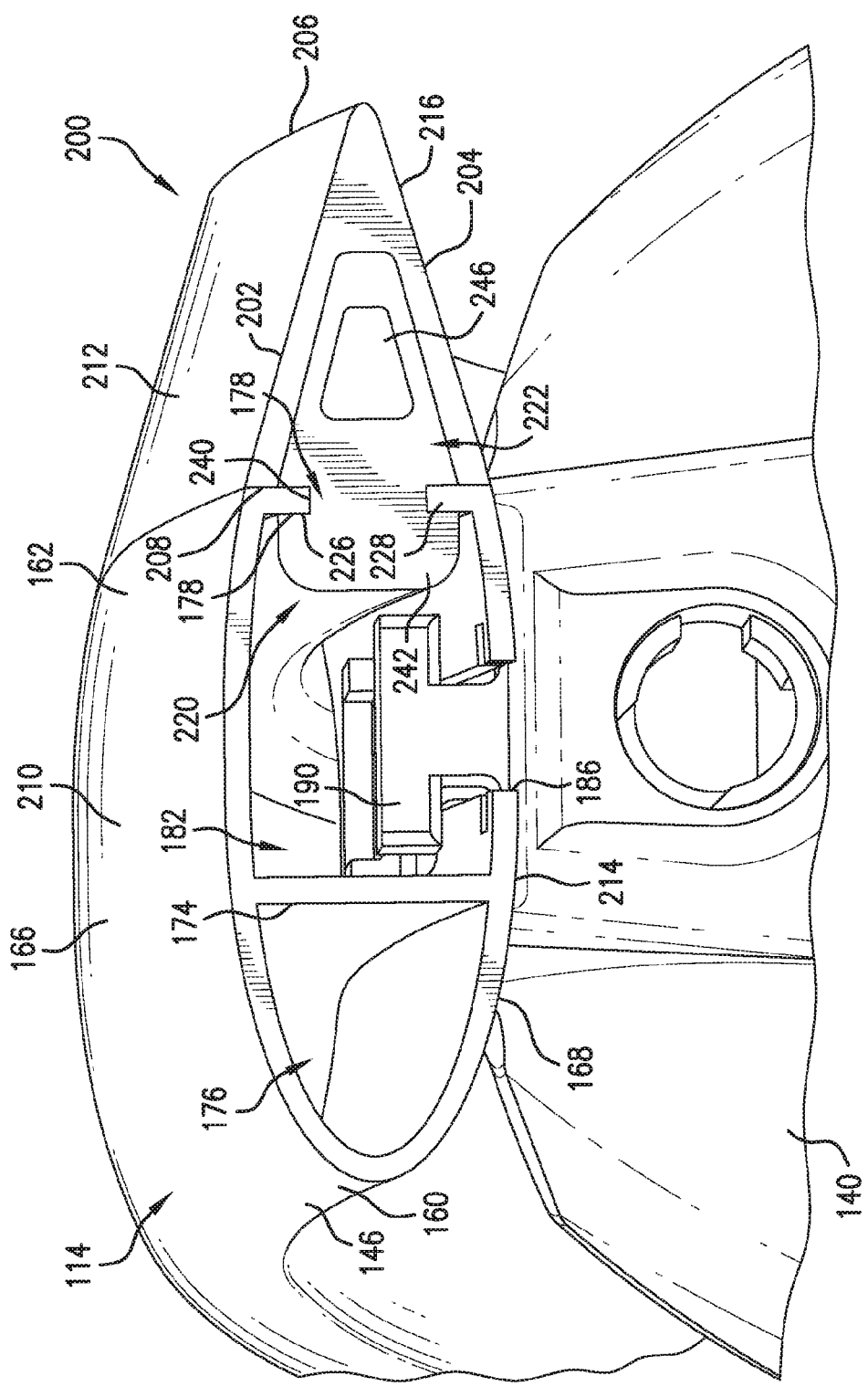
FIG. 3 is an enlarged perspective view of FIG. 2.

The features of the exemplary first and second cross bars 114, 116 of the roof rack 102 will be described with respect to the first cross bar 114 (and will be referred hereafter as "cross bar 114"), and it should be appreciated to one skilled in the art that the second cross bar 116 can be similarly constructed. With reference to FIGS. 2-4, the cross bar 114 may have an aerodynamic cross-section with a curved leading edge 160 and a tapering trailing edge 162. When the cross bar 114 is installed on the roof rack 102, the leading edge 160 faces the front of the vehicle 100 and the trailing edge 162 faces the rear of the vehicle 100. The cross bar 114 further includes an upper side 166 that extends from the leading edge 160 to the trailing edge 162, and a lower side 168 that extends from the leading edge to the trailing edge 162.

One or more walls may be provided between the upper side 166 and the lower side 168 of the cross bar 114. In a non-limiting example, a first wall 174 extends between the upper and lower sides 166, 168 and together with the curved leading edge 160 defines a first chamber 176. In addition, or alternatively, a second wall 178 may be provided that extends between the upper and lower sides 166, 168 at or near the trailing edge 162 of the cross bar 114. In the depicted embodiment, the second wall 178 is an end wall of the cross bar 114 and defines an outer surface of the cross bar 114. A second chamber 182 of the cross bar 114 is at least partially defined by the upper and lower sides 166, 168 together with the second wall 178. In the depicted embodiment, the connectors 140, 142 are secured to that part of the lower side 168 which defines the second chamber 182. By way of example, cutouts or slots 186, 188 can be provided on the lower side 168 at the respective end portions 146, 148. The slots 186, 188 are configured to receive corresponding mounting features 190, 192 provided on the respective connectors 140, 142. Once positioned within the slots 186, 188, end caps 196, 198 (FIG. 5) can be secured to the respective end portions 146, 148.

Figure 5:
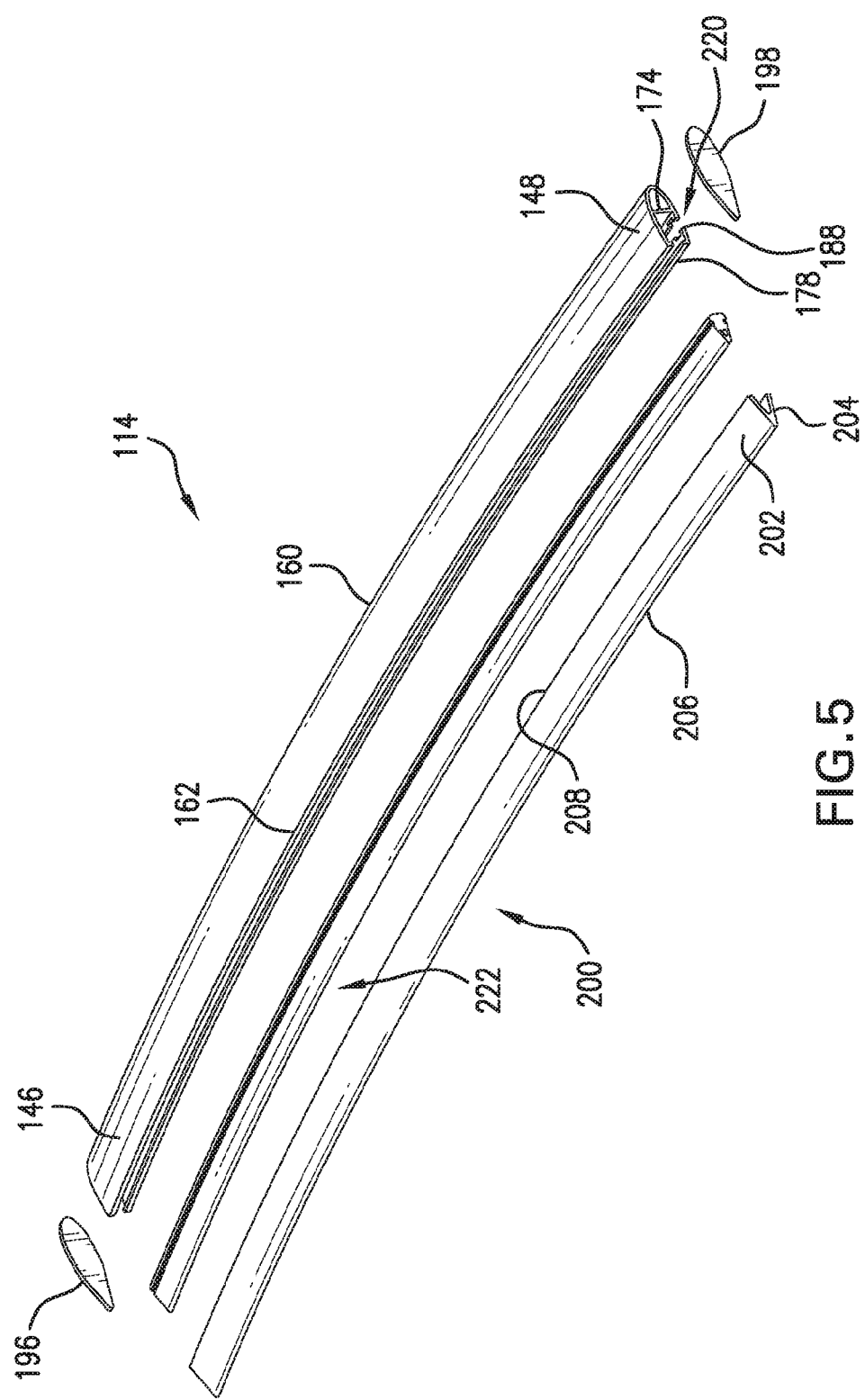
FIG. 5 is a partial exploded perspective view of the cross bar of FIG. 2.

According to the present disclosure, a separate tail 200 is securable to the cross bar 114. As shown in FIG. 3, the tail 200 includes an upper leg 202 and a lower leg 204, a trailing end or edge 206, and a leading end or edge 208. When the tail 200 is secured to the cross bar 114, the upper leg 202 extends from the upper side 166 of the cross bar 114 to the trailing edge 206 of the tail 200. The lower leg 204 extends from the lower side 168 of the cross bar 114 to the tail trailing edge 206. As shown in FIG. 3, the outer surfaces 210, 212 of the respective cross bar upper side 166 and tail upper leg 202 define a continuous upper outer surface that extends from the cross bar leading edge 160 to the tail trailing edge 206, and outer surfaces 214, 216 of the respective cross bar lower side 168 and the tail lower leg 204 may define a continuous lower outer surface that extends from the cross bar leading edge 160 to the tail trailing edge 206. It should be noted that the tail 200 can be of any length, and as shown in FIG. 5 the tail 200 may have a length approximately equal to a length of the cross bar 114.

As shown in FIG. 3, the upper leg 202 and the lower leg 204 may extend away from the cross bar 114 and toward each other so that the tail 200 tapers to a tip at the trailing edge 206. In a non-limiting example, the tail 200 as secured to the vehicle includes a radius of curvature of less than 2.5 mm.

In the non-limiting example shown in FIG. 3, the tail 200 is securable to the cross bar 114. One of the cross bar 114 and the tail 200 includes an engagement member 222 that secures the tail 200 to the cross bar 114. According to one aspect, and with continued reference to FIGS. 3 and 4, the cross bar 114 includes a receiving member such as an elongated channel 220 and the tail 200 includes the engagement member 222 that is received in the receiving feature to interlock the tail 200 with the cross bar 114. For example, the second wall 178 of the cross bar 114 includes a first wall part 226 extending downward from the upper side 166 and a second wall part 228 extending upwardly from the lower side 168. Distal ends of the first and second wall parts 226, 228 are spaced from one another to at least partially define the channel 220. The engagement member 222 includes a neck 240 and a head 242 extending from the neck. The head 242 is received in the second chamber 182, and the neck 240 is received in the channel 220 between the distal ends of the respective first and second wall parts 226, 228. Accordingly, the first and second wall parts 226, 228 are positioned between the neck 240 and the head 242 of the engagement member 222 to interlock the tail 200 with the cross bar 114. An elongated bore 246 can extend lengthwise through the engagement member 222; however, it should be appreciated that the engagement member 222 can be devoid of the bore 246 as depicted in FIG. 6.

It is to be understood that the engagement member can be integral with the tail 200 or the cross bar 114, or can be a separate component that is secured to the tail 200 or the cross bar 114. In the embodiments of FIGS. 4 and 6, the engagement member 222 is a separate component that is secured to the tail 200. For example, the engagement member 222 may be secured to the tail 200 in a space between the upper and lower legs 202, 204. To secure the tail 200 to the cross bar 114, the engagement member 222 is slidingly received in the channel 200. After the tail 200 is properly positioned with respect to the cross bar 114, the connectors 140, 142 are mounted to the respective end portions 146, 148 of the cross bar 114, the end caps 196, 198 are attached to the respective end portions 146, 148, and the cross bar 114 is then connected to the first and second side rails 110, 112. It is to be understood, however, that the method of assembly and securing the cross bar 114 to the vehicle is not limited to such a sequence or any particular roof rail or cross bar mounting configuration.

Figure 7:
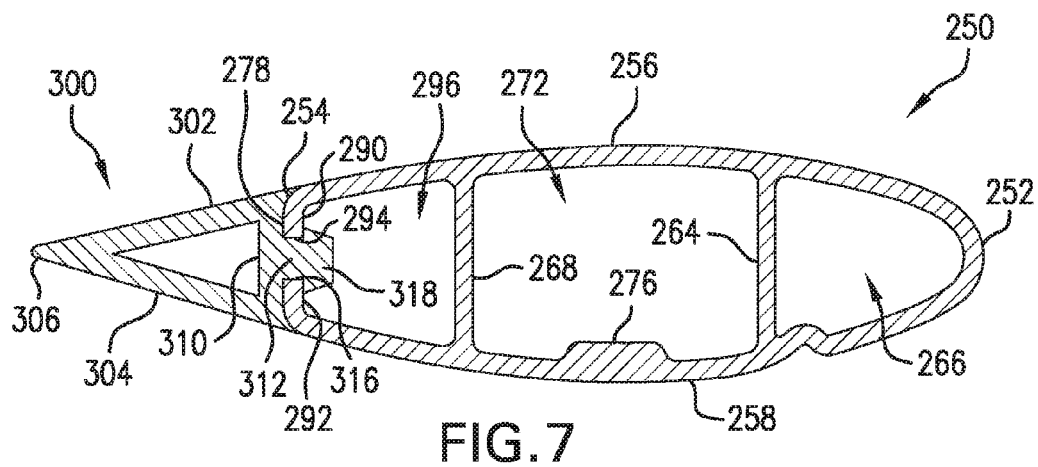

In the embodiment of FIG. 7, a cross bar 250 of the roof rack 102 may include a curved leading edge 252 and a tapering trailing edge 254. An upper side 256 extends from the leading edge 252 to the trailing edge 254, and a lower side 258 extends from the leading edge to the trailing edge. A first wall 264 may be provided that extends between the upper and lower sides 256, 258 and together with the curved leading edge 252 defines a first chamber 266. A second wall 268 may be provided that is spaced rearward of the first wall 264 also extends between the upper and lower sides 256, 258. A second chamber 272 of the cross bar 250 is at least partially defined by the upper and lower sides 256, 258 together with the second wall 268. The lower side 258 can include a strengthening rib 276 extending along a length of the cross bar 250 and projecting into the second chamber 272. A third wall 278 may be spaced rearward of the second wall 268 that extends between the upper and lower sides 256, 258 and defines an end wall (and outer surface) of the cross bar 250. Similar to the cross bar 114, the third wall 278 of the cross bar 250 includes a first wall part 290 extending downward from the upper side 256 and a second wall part 292 extending upwardly from the lower side 258. Distal ends of the first and second wall parts 290, 292 are spaced from one another to at least partially define an elongated channel 294. A third chamber 296 of the cross bar 250 is defined by the upper and lower sides 256, 258 together with the second and third walls 268, 278.

A tail 300 is securable to the cross bar 250 and includes an upper leg 302 and a lower leg 304. When the tail 300 is secured to the cross bar 250, the upper leg 302 extends from the upper side 256 of the cross bar 250 to a trailing edge 306 of the tail 300. The lower leg 304 extends from the lower side 258 of the cross bar 250 to the tail trailing edge 306. In the aspect of FIG. 7, the tail 300 includes a connecting wall 310 extending between the upper and lower legs 302, 304. An engagement member 312 that is integral with the tail 300 extends outwardly from the connecting wall 310 and includes a neck 316 and a head. The head 318 is received in the third chamber 296, and the neck 316 is received in the channel 294 between the distal ends of the respective first and second wall parts 290, 292 so that the first and second wall parts 290, 292 are positioned between the connecting wall 310 and the head 318 of the engagement member 312 to interlock the tail 300 with the cross bar 250.

Figure 8:
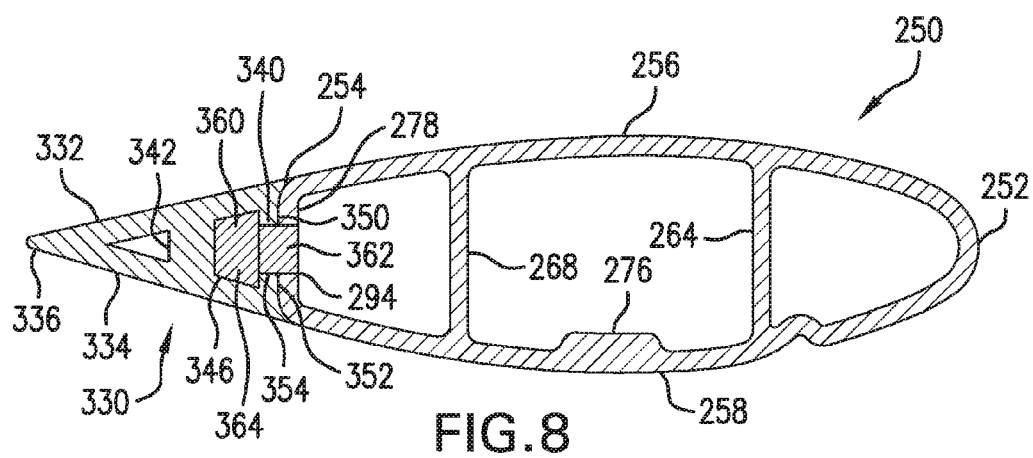

In the embodiment of FIG. 8, a tail 330 is securable to the cross bar 250 and includes an upper leg 332 and a lower leg 334. When the tail 330 is secured to the cross bar 250, the upper leg 332 extends from the upper side 256 of the cross bar 250 to a trailing edge 336 of the tail 330. The lower leg 334 extends from the lower side 258 of the cross bar 250 to the tail trailing edge 336. A first connecting wall 340 and a second connecting wall 342 spaced rearward of the first connecting wall each extend between the upper and lower legs 332, 334, and the connecting walls together with the upper and lower legs define a chamber 346. The first connecting wall 340 defines an end wall (and outer surface) of the tail 330 and includes a first wall part 350 extending downward from the upper leg 332 and a second wall part 352 extending upwardly from the lower leg 334. Distal ends of the first and second wall parts 350, 352 are spaced from one another to at least partially define an elongated channel 354.

According to the aspect of FIG. 8, the cross bar 250 includes an engagement member 360 that is receiveable in the channel 354 of the tail 330. More particularly, the engagement member 360 includes a neck 362 and a head 364 extending from the neck 362. The neck 362 is positioned in the channel 354 and the head 364 is positioned in the chamber 346. As shown, the chamber 346 is sized to slidingly receive the head 364. Accordingly, the respective first and second wall parts 350, 352 are positioned between the head 364 and the third wall 278 with the first connecting wall 340 abutting the third wall 278. As shown, the engagement member 360 is separate from and secured to the cross bar 250; although, it should be appreciated that the engagement member 360 can be integrally formed with the cross bar 250.

Figure 9:
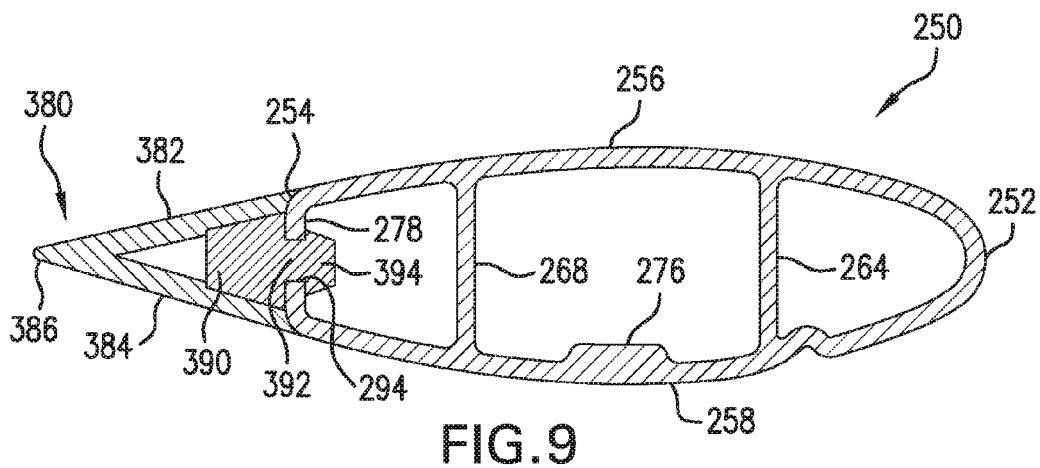

FIG. 9 depicts a tail 380 that is securable to the cross bar 250 that includes an upper leg 382 and a lower leg 384. When the tail 380 is secured to the cross bar 250, the upper leg 382 extends from the upper side 256 of the cross bar 250 to a trailing edge 386 of the tail 380. The lower leg 384 extends from the lower side 258 of the cross bar 250 to the tail trailing edge 386. The tail 380 includes an engagement member 390 received in the channel 294 of the third wall 278. Similar to the previous embodiments, the engagement member 390 includes a neck 392 and a head 394 extending from the neck 392. As shown, the engagement member 390 is separate from the tail 380 and is secured in a space between the upper and lower legs 382, 384. However, it should be appreciated that the engagement member 390 can be integrally formed with the tail 380.

Figure 10:
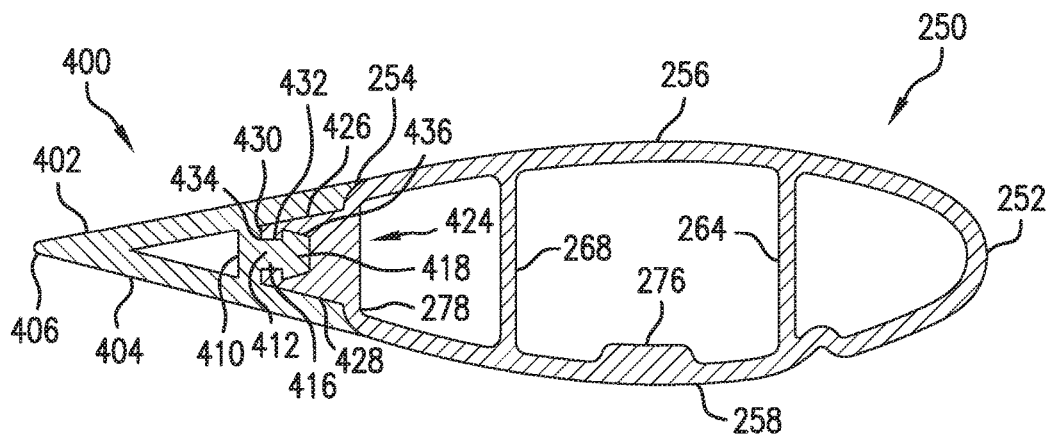
Figure 11:
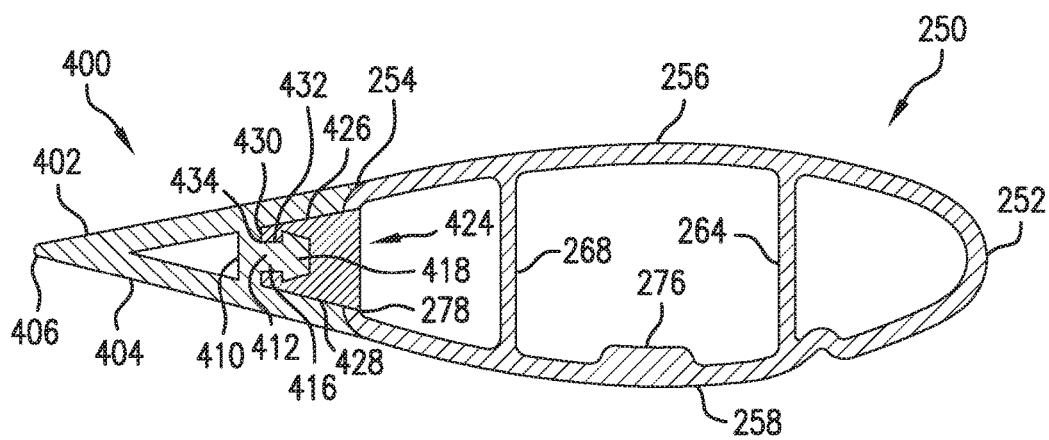

FIGS. 10 and 11 depict a tail 400 that is securable to the cross bar 250 and that includes an upper leg 402 and a lower leg 404. When the tail 400 is secured to the cross bar 250, the upper leg 402 extends from the upper side 256 of the cross bar 250 to a trailing edge 406 of the tail 400. The lower leg 404 extends from the lower side 258 of the cross bar 250 to the tail trailing edge 406. Similar to the aspect of FIG. 7, the tail 400 includes a connecting wall 410 extending between the upper and lower legs 402, 404. An engagement member 412 that is integral with the tail 400 extends outwardly from the connecting wall 410 and includes a neck 416 and a head 418. The engagement member 412 is received in the channel 432. In this embodiment, the upper and lower legs 402, 404 extend past the head 418 of the engagement member 412 (i.e., the engagement member 412 is offset rearward from ends of the upper and lower legs 402, 404).

The cross bar 250 includes a receiving member 424 that receives the engagement member 412. In the depicted aspect, the receiving member 424 extends outwardly from the trailing edge 254 of the cross bar 250. The receiving member 424 includes an upper surface 426, a lower surface 428 and an end wall 430 and may be positioned in a space defined by the connecting wall 410 and the upper and lower legs 402, 404 of the tail 400. Alternatively, the receiving member 424 may be partially or entirely housed in the cross bar 250. The receiving member 424 is provided with an elongated channel 432 that extends lengthwise therethrough, the channel 432 providing access to an elongated chamber 436. The channel 432 is shaped and sized for receiving the neck 416 of the engagement member 412, and the chamber is shaped and sized for receiving the head 418 of the engagement member 412. In the assembled condition, the neck 416 of the engagement member 412 is positioned in the channel 432 with the end wall 430 positioned between the connecting wall 410 and the head 418, which is positioned in the chamber 436, to interlock the tail 400 with the cross bar 250. According to the aspect of FIG. 10, the receiving member 424 is integrally formed with the cross bar 250. According to the aspect of FIG. 11, the receiving member 424 can be a separate member secured to the cross bar 250.

Figure 12:
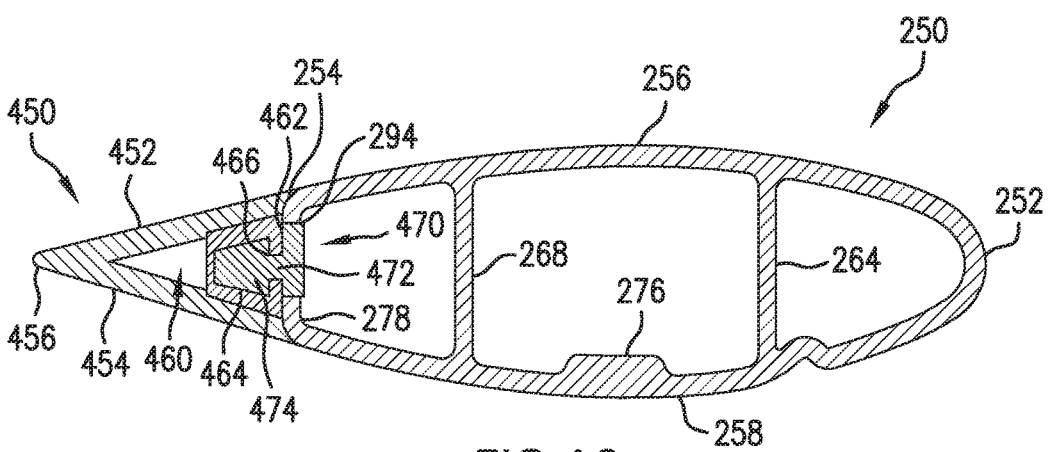

With reference to FIG. 12, a tail 450 is securable to the cross bar 250 and includes an upper leg 452 and a lower leg 454. When the tail 450 is secured to the cross bar 250, the upper leg 452 extends from the upper side 256 of the cross bar 250 to a trailing edge 456 of the tail 450. The lower leg 454 extends from the lower side 258 of the cross bar 250 to the tail trailing edge 456. A receiving member 460 is secured in a space defined by the upper and lower legs 452, 454. The receiving member 460 includes an end wall 462 and has an elongated chamber 464 extending lengthwise therethrough. The end wall 462 is provided with an elongated channel 466 providing access to the chamber 464. As depicted, the receiving member 460 is separate from the tail 450; although, it should be appreciated that the receiving member can be integrally formed with the tail.

The cross bar 250 includes an engagement member 470 having a neck 472 and a head 474 extending from the neck 472. The neck 472 is positionable in the channel 466 located in the end wall 462 of the tail 400. The chamber 464 is shaped and sized to receive the head 474 of the engagement member 470. In the assembled condition, the head 418 is positioned in the chamber 464 with the end wall 462 being positioned between the third wall 278 and the head 474 to interlock the tail 400 to the cross bar 250. As shown, the engagement member 470 is separate from and secured to the cross bar 250; although, it should be appreciated that the engagement member 470 can be integrally formed with the cross bar 250.

In an embodiment, the cross bars 114, 116, 250 may have a higher hardness than the tails 200, 330, 330, 380, 400, 450. The engagement member 222, 360, 390, 470 may have a hardness that is greater than the tails 200, 330, 330, 380, 400, 450 but less than the cross bars 114, 116, 250. In a non-limiting example, the cross bars 114, 116, 250 may be at least partially formed of a first material (e.g., an aluminum or aluminum-based alloy), and the tails 200, 330, 330, 380, 400, 450 may be at least partially formed of a second material (e.g., an elastomer such an EPDM rubber) having a hardness or stiffness less than a hardness or stiffness of the first material. The engagement members 222, 360, 390, 470 can be formed of a third material (e.g., a thermoplastic elastomer) and can be coextruded with the respective tails 200, 380 or the cross bar 250. In a non-limiting example, the tail 200, 330, 330, 380, 400, 450 is comprised of a material including a hardness of less than or equal to 60 shore A as measured by ASTM D2240 type A scale. In a non-limiting example, the third material has a hardness or stiffness greater than the second material, but less than the first material. In a non-limiting example, the hardness of the cross bar 114, 116, 250, the tail 200, 330, 330, 380, 400, 450, and the engagement member 222, 360, 390, 470 is measured as installed on the vehicle. The receiving member 424 can be formed of the first material or fourth material, and the receiving member 460 can be formed of the third material or a fifth material and can be coextruded with the tail 450.

In an embodiment, a method of assembling the cross bar assembly is provided. Referring to FIGS. 3 and 5, the tail 200 is provided with the co-extruded engagement member 222 and the cross bar 114 is provided with the receiving member (channel 220). The leading edge 208 of the tail 200 is aligned with the trailing edge 162 of the cross bar 114 so that the head 242 of the engagement member 222 is aligned with the second chamber 182 and the neck 240 is aligned with the channel 220. Either the cross member 114, the tail 200, or both the cross member 114 and the tail 200 are then moved so that the engagement member 222 is slidingly received in the receiving member (the head 242 being received in the second chamber 182 and the neck 240 in the channel 220) and the leading edge 208 of the tail 200 is slid toward the trailing edge 162 of the cross bar 114, thereby securing the tail 200 to the cross bar 114. The end caps 196 and 198 may then be secured to the end portions 146, 148 of the cross bar 114 to cover the open ends of the channel 220 and prevent removal of the engagement member 222 from the channel 220 and second chamber 182. It is to be understood that the tail 200 may be secured to the cross bar 114 before or after the cross bar 114 has been secured to the roof rail of the vehicle.

As is evident from the foregoing, the present disclosure provided an exemplary method of assembling a roof-rack assembly. The method generally comprises providing a cross bar comprising a first material, the cross bar includes a first end, a second end, a leading edge, a trailing edge, an upper side having an outer surface that extends from the leading edge to the trailing edge, and a lower side having an outer surface that extends from the leading edge to the trailing edge; providing an elongated tail comprising a second material that is different than the first material, the tail including an upper leg and a lower leg; providing an engagement member on one of the cross bar and the tail; and providing a feature for receiving the engagement member on the other of the cross bar and the tail.

The exemplary method further comprises positioning the engagement member in the receiving feature to interlock the cross bar and the tail with the first leg positioned adjacent the upper side with an outer surface of the first leg and the outer surface of the upper side forming a continuous upper surface that extends from the cross bar leading edge to a tail trailing edge, and with the second leg positioned adjacent the lower side with an outer surface of the second leg and the outer surface of the lower side forming a continuous lower surface that extends from the cross bar leading edge to the tail trailing edge.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A cross bar assembly comprising:
   a cross bar including a leading edge that defines a forwardmost edge of the cross bar assembly, a tapering trailing edge, an upper side that extends from the leading edge to the trailing edge, and a lower side that extends from the leading edge to the trailing edge, the cross bar comprising a first material having a hardness; and
   a tail that is securable to the trailing edge of the cross bar, the tail including a trailing edge that defines a rewardmost edge of the cross bar assembly, the tail comprising a second material having a hardness that is less than a hardness of the first material of the cross bar.

2. The cross bar assembly of claim 1, wherein the tail includes an upper leg and a lower leg, the upper leg extends from the upper side of the cross bar to the trailing edge of the tail and the lower leg extends from the lower side of the cross bar to the trailing edge of the tail when the tail is secured to the cross bar, and wherein outer surfaces of the respective cross bar upper side and tail upper leg define a continuous upper surface that extends from the cross bar leading edge to the tail trailing edge, and outer surfaces of the respective cross bar lower side and the tail lower leg define a continuous lower surface that extends from the cross bar leading edge to the tail trailing edge.

3. The cross bar assembly of claim 1, wherein one of the cross bar and the tail includes an engagement member that secures the tail to the cross bar.

4. The cross bar assembly of claim 3, wherein the trailing edge of the cross bar includes a wall extending between the upper and lower sides, the tail includes the engagement member, and the engagement member is secured to the wall.

5. The cross bar assembly of claim 4, wherein the wall of the cross bar at least partially defines an elongated channel and the engagement member is received in the channel.

6. The cross bar assembly of claim 5, wherein the wall of the cross bar includes a first wall part extending downward from the upper side and a second wall part extending upwardly from the lower side, distal ends of the first and second wall parts spaced from one another to at least partially define the channel, and
   the engagement member includes a neck and a head extending from the neck, the head is received in the channel and the distal ends of the first and second wall parts flanking the neck.

7. The cross bar assembly of claim 6, wherein the tail includes a connecting wall extending between the upper and lower legs, the engagement member extends outwardly from the connecting wall, the first and second wall parts are positioned between the connecting wall and the head of the engagement member.

8. The cross bar assembly of claim 3, wherein the engagement member is comprised of a third material having a hardness less than the hardness of the first material and greater than the hardness of the second material.

9. The cross bar assembly of claim 8, wherein the engagement member is coextruded with the tail.

10. The cross bar assembly of claim 4, wherein the wall of the cross bar includes a separate receiving member defining an elongated channel that receives the engagement member.

11. The cross bar assembly of claim 10, wherein the receiving member is positioned in a space defined by the upper and lower legs of the tail.

12. The cross bar assembly of claim 4, wherein the tail includes an elongated channel and the wall of the cross bar includes the engagement member received in the channel of the tail.

13. The cross bar assembly of claim 12, wherein the tail includes a connecting wall extending between the upper and lower legs, the connecting wall at least partially defines the channel, and
   the engagement member includes a neck and a head extending from the neck, the head received in the channel, the connecting wall abutting the wall of the cross bar.

14. The cross bar assembly of claim 12, wherein the tail includes a separate receiving member located in a space defined by and secured to the upper and lower legs, the receiving member including the elongated channel.

15. A cross bar assembly comprising:
   a unitary, one-piece cross bar including a leading edge that defines a forwardmost edge of the cross bar assembly and a trailing edge, an upper side that extends from the leading edge to the trailing edge, and a lower side that extends from the leading edge to the trailing edge;
   a tail that is securable to the cross bar, the tail including an upper leg that extends from the upper side to a tail trailing edge, and a lower leg that extends from the lower side to the tail trailing edge when the tail is secured to the cross bar; and
   an engagement member positioned on the tail that is engageable with the cross bar to secure the tail to the cross bar,
   wherein the trailing edge of the cross bar includes a wall extending between the upper and lower sides, and the engagement member is secured to the wall.

16. The cross bar assembly of claim 15, wherein outer surfaces of the respective cross bar upper side and tail upper leg define a continuous upper surface that extends from the cross bar leading edge to the tail trailing edge, and outer surfaces of the respective cross bar lower side and the tail lower leg define a continuous lower surface that extends from the cross bar leading edge to the tail trailing edge when the tail is secured to the cross bar, and wherein the wall of the cross bar includes an elongated channel that receives the engagement member.

17. The cross bar assembly of claim 15, wherein the engagement member is at least partially positioned between the upper and lower legs of the tail, the tail comprising a hardness and the engagement member comprising a higher hardness than the tail, and the engagement member is coextruded with the tail.

18. A cross bar assembly comprising:
   a unitary, one-piece cross bar comprising a hardness, the cross bar including:
      a leading edge and a trailing edge,
      an upper side that extends from the leading edge to the trailing edge,
      a lower side that extends from the leading edge to the trailing edge, and
      the trailing edge includes a wall extending between the upper and lower sides;
   a tail comprising a hardness that is less than the hardness of the cross bar, the tail is separate from and securable to the cross bar, the tail including:
      a tail leading edge and a tail trailing edge,
      an upper leg that extends from the upper side between the tail leading edge and the tail trailing edge when the tail is secured to the cross bar, and
      a lower leg that extends from the lower side between the tail leading edge and the tail trailing edge when the tail is secured to the cross bar; and
   an engagement member comprising a hardness that is greater than the hardness of the tail and less than the hardness of the cross bar, the engagement member is positioned on one of the cross bar and the tail and is engageable with the other of the cross bar and the tail to secure the tail to the wall at the trailing edge of the cross bar.

19. A method of assembling a cross bar assembly comprising:
   providing a unitary, one-piece cross bar comprised of a first material, the cross bar includes a first end, a second end, a leading edge, a trailing edge, an upper side having an outer surface that extends from the leading edge to the trailing edge, and a lower side having an outer surface that extends from the leading edge to the trailing edge;
   providing an elongated tail separate from the cross bar, the tail comprised of a second material that is different than the first material and having a hardness that is less than a hardness of the first material of the cross bar, the tail including an upper leg and a lower leg;
   providing an engagement member on one of the cross bar and the tail, the engagement member comprised of a third material having a hardness less than the hardness of the first material and greater than the hardness of the second material;
   providing a receiving member for receiving the engagement member on the other of the cross bar and the tail; and
   positioning the engagement member in the receiving member to interlock the cross bar and the tail.

* * * * *